United States Patent
Zinn et al.

(10) Patent No.: US 8,211,389 B2
(45) Date of Patent: Jul. 3, 2012

(54) METAL SCAVENGING POLYMERS AND USES THEREOF

(75) Inventors: Paul J. Zinn, Montgomery, IL (US); Jitendra T. Shah, Naperville, IL (US); William J. Andrews, Montgomery, IL (US)

(73) Assignee: Nalco Company, Naperville, IL (US)

( * ) Notice: Subject to any disclaimer, the term of this patent is extended or adjusted under 35 U.S.C. 154(b) by 190 days.

(21) Appl. No.: 12/754,683

(22) Filed: Apr. 6, 2010

(65) Prior Publication Data

US 2011/0243819 A1    Oct. 6, 2011

(51) Int. Cl.
   *C22B 3/00*   (2006.01)
(52) U.S. Cl. ............ 423/42; 423/22; 423/140; 423/141; 423/142; 423/101; 423/102; 423/92; 423/93; 423/50; 423/158; 423/160; 423/508; 423/87; 423/210; 423/215.5; 210/732; 210/733; 210/734; 210/735
(58) Field of Classification Search ............ 423/22, 423/42, 140–142, 101, 102, 92, 93, 50, 158, 423/160, 508, 87, 11, 210, 215.5; 210/732–735
See application file for complete search history.

(56) References Cited

U.S. PATENT DOCUMENTS

| | | | |
|---|---|---|---|
| 4,435,548 A | 3/1984 | Tomalia et al. | |
| 5,164,095 A | 11/1992 | Sparapany et al. | |
| 5,346,627 A | 9/1994 | Siefert et al. | |
| 5,510,040 A | 4/1996 | Miller et al. | |
| 5,523,002 A | 6/1996 | Carey et al. | |
| 5,658,487 A | 8/1997 | Carey et al. | |
| 6,667,384 B2 | 12/2003 | Gu et al. | |
| 6,808,692 B2 * | 10/2004 | Oehr | 423/210 |
| 6,878,358 B2 * | 4/2005 | Vosteen et al. | 423/210 |
| 2005/0040108 A1 * | 2/2005 | Jay | 210/638 |
| 2007/0056706 A1 | 3/2007 | Crisp et al. | |
| 2007/0248512 A1 * | 10/2007 | Kawawa et al. | 423/1 |

FOREIGN PATENT DOCUMENTS

JP    2000015222    1/2000

OTHER PUBLICATIONS

Translation of Japan 08-173936, Jul. 1996.*
Translation of Japan 2000-063794, Feb. 2000.*
McCubbin et al.; Dithiocarbamate-Functionalized Dendrimers as Ligands for Metal Complexes; Inorganic Chemistry, 1998, 37(15), 3753-58.

* cited by examiner

*Primary Examiner* — Steven Bos
(74) *Attorney, Agent, or Firm* — Edward O. Yonter

(57) ABSTRACT

Uses for a composition comprising a polymer derived from at least two monomers: acrylic-x and an alkylamine, wherein said polymer is modified to contain a functional group capable of scavenging one or more compositions containing one or more metals are disclosed. These polymers have many uses in various mediums, including wastewater systems.

20 Claims, 1 Drawing Sheet

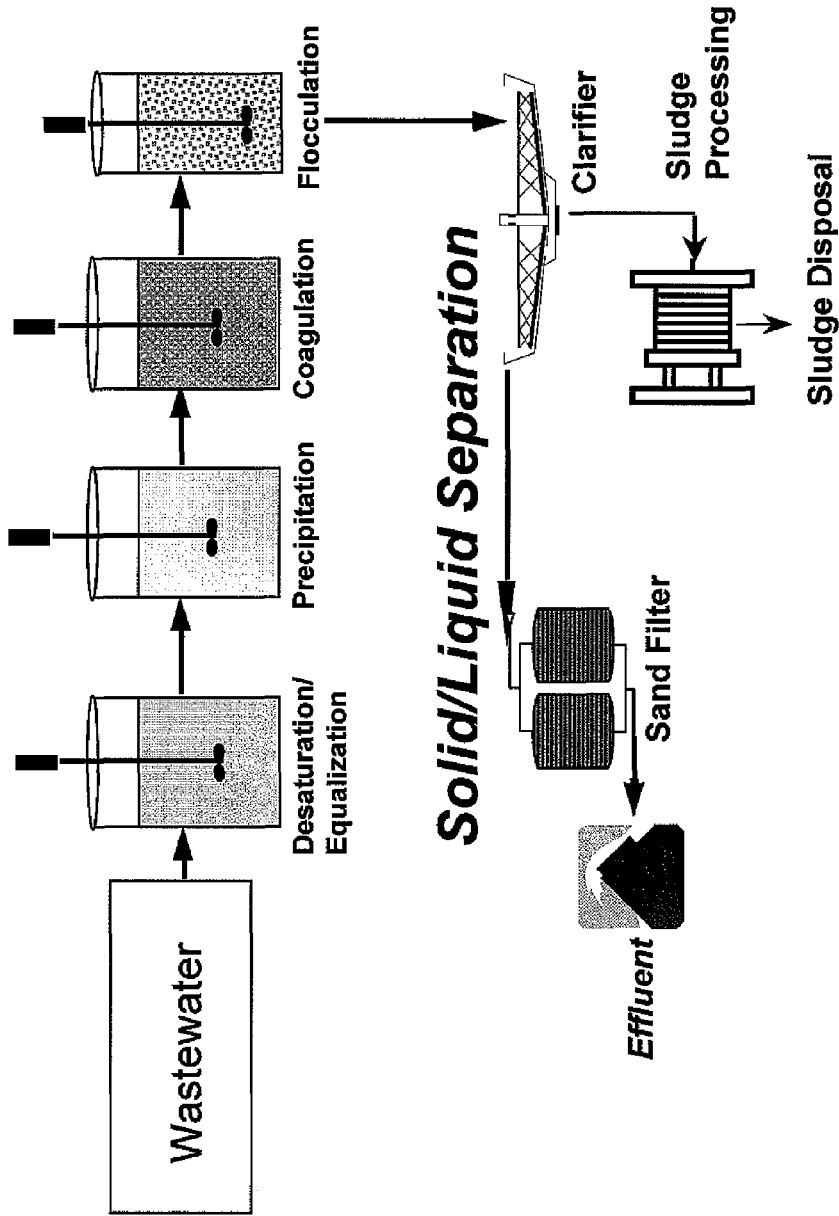

METAL SCAVENGING POLYMERS AND USES THEREOF

FIELD OF THE INVENTION

The field of the invention pertains to novel metal scavenging polymers and uses thereof.

BACKGROUND OF THE INVENTION

Metal scavenging for various mediums, such as process water and air have been a challenge for various industries, including heavy and light industry, such as power plants and mining operations. In addition, metal scavenging for process waters have been an object for municipal applications as well.

On-going investigations for improved metal scavenging technology have been desired by various industries. The present disclosure addresses various avenues for handling metals management in industrial and municipal processes. These chemistries could be potentially utilized for other various applications that require metal scavenging.

BRIEF DESCRIPTION OF THE DRAWINGS

FIG. 1 shows a general schematic of a portion of a wastewater treatment system.

SUMMARY OF THE INVENTION

The present disclosure provides for a composition comprising a polymer derived from at least two monomers: acrylic-x and an alkylamine, wherein said acrylic-x has the following formula:

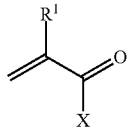

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals.

The present disclosure also provides for a method of removing one or more metals from a medium containing these metals which comprises the steps of: (a) treating said medium containing metals with a composition comprising a polymer derived from at least two monomers: acrylic-x and an alkylamine, wherein said acrylic-x has the following formula:

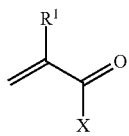

wherein X=OR, OH and salts thereof, or $NHR^2$ and wherein $R^1$ and $R^2$ is H or an alkyl or aryl group, wherein the molecular weight of said polymer is between 500 to 200,000, and wherein said polymer is modified to contain a functional group capable of scavenging one or more compositions containing one or more metals; (b) and collecting said treated metals.

DETAILED DESCRIPTION OF THE INVENTION

A. Compositions

The present disclosure provides for a composition comprising a polymer derived from at least two monomers: acrylic-x and an alkylamine, wherein said acrylic-x has the following formula:

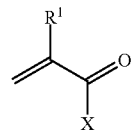

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals.

The metals can include zero valent, monovalent, and multivalent metals. The metals may or may not be ligated by organic or inorganic compounds. Also, the metals can be radioactive and nonradioactive. Examples include, but are not limited to, transition metals and heavy metals. Specific metals can include, but are not limited to: copper, nickel, zinc, lead, mercury, cadmium, silver, iron, manganese, palladium, platinum, strontium, selenium, arsenic, cobalt and gold.

The molecular weight of the polymers can vary. For example, the target species/application for the polymers can be one consideration. Another factor can be monomer selection. Molecular weight can be calculated by various means known to those of ordinary skill in the art. For example, size exclusion chromatography, as discussed in the examples below can be utilized.

When molecular weight is mentioned, it is referring to the molecular weight for the unmodified polymer, otherwise referred to as the polymer backbone. The functional groups that are added to the backbone are not part of the calculation. Thus the molecular weight of the polymer with the functional groups can far exceed the molecular weight range.

In one embodiment, the molecular weight of the polymer is from 1,000 to 16,000.

In another embodiment, the molecular weight of said polymer is from 1,500 to 8,000.

Various functional groups can be utilized for metal scavenging. The following phraseology would be well understood by one of ordinary skill in the art: wherein said polymer is modified to contain a functional group capable of scavenging one or more compositions containing one or more metals. More specifically, the polymer is modified to contain a functional group that can bind metals.

In one embodiment, the functional group contains a sulfide containing chemistry.

In another embodiment, the functional group is a dithiocarbamate salt group.

In another embodiment, the functional groups are at least one of the following: alkylene phosphate groups, alkylene carboxylic acids and salts thereof, oxime groups, amidooxime groups, dithiocarbamic acids and salts thereof, hydroxamic acids, and nitrogen oxides.

The molar amounts of the functional group relative to the total amines contained in the unmodified polymer can vary as well. For example, the reaction of 3.0 molar equivalents of carbon disulfide to a 1.0:1.0 mole ratio acrylic acid/TEPA copolymer, which contains 4 molar equivalents of amines per repeat unit after polymerization, will result in a polymer that is modified to contain 75 mole % dithiocarbamate salt group. In other words, 75% of the total amines in the unmodified polymer has been converted to dithiocarbamate salt groups.

In one embodiment, the polymer has between 5 to 100 mole % of the dithiocarbamate salt group. In a further embodiment, the polymer has from 25 to 90 mole % of the dithiocarbamate salt group. In yet a further embodiment, the polymer has from 55 to 80 mole % of the dithiocarbamate salt group.

Monomer selection will depend on the desired polymer that one of ordinary skill in the art would want to make.

The alkylamines may vary in kind.

In one embodiment, the alkylamine is at least one of the following: an ethyleneamine, a polyethylenepolyamine, ethylenediamine (EDA), diethylenetriamine (DETA), triethylenetetraamine (TETA) and tetraethylenepentamine (TEPA) and pentaethylenehexamine (PEHA).

The acrylic-x monomer group can vary as well.

In another embodiment, the acrylic-x is at least one of the following: methyl acrylate, methyl methacrylate, ethyl acrylate, and ethyl methacrylate, propyl acrylate, and propyl methacrylate.

In another embodiment, the acrylic-x is at least one of the following: acrylic acid and salts thereof, methacrylic acid and salts thereof, acrylamide, and methacrylamide.

The molar ratio between monomers that make up the polymer, especially acrylic-x and alkylamine can vary and depend upon the resultant polymer product that is desired. The molar ratio used is defined as the moles of acrylic-x divided by the moles of alkylamine.

In one embodiment, the molar ratio between acrylic-x and alkylamine is from 0.85 to 1.5.

In another embodiment, the molar ratio between acrylic-x and alkylamine is from 1.0 to 1.2.

Various combinations of acrylic-x and alkylamines are encompassed by this invention as well as associated molecular weight of the polymers.

In one embodiment, the acrylic-x is an acrylic ester and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic ester can be at least one of the following: methyl acrylate, methyl methacrylate, ethyl acrylate, and ethyl methacrylate, propyl acrylate, and propyl methacrylate, which is combined with at least one of the alkylamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, 55 to 80 mole %.

In another embodiment, the acrylic-x is an acrylic amide and the alkylamine is TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic amide can be at least one or a combination of acrylamide and methacrylamide, which is combined with at least one of the alkylamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

In another embodiment, the acrylic-x is an acrylic acid and salts thereof and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic acid can be at least one or a combination of acrylic acid or salts thereof and methacrylic acid or salts thereof, which is combined with at least one of the alkylamines, which includes TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

Additional monomers can be integrated into the polymer backbone made up of constituent monomers acrylic-x and alkylamine. A condensation polymer reaction scheme can be utilized to make the basic polymer backbone chain. Various other synthesis methods can be utilized to functionalize the polymer with, for example, dithiocarbamate and/or other non-metal scavenging functional groups. One of ordinary skill in the art can functionalize the polymer without undue experimentation.

Moreover, the composition of the present invention can be formulated with other polymers such as those disclosed in U.S. Pat. No. 5,164,095, herein incorporated by reference, specifically, a water soluble ethylene dichloride ammonia polymer having a molecular weight of from 500 to 100,000 which contains from 5 to 50 mole % of dithiocarbamate salt groups. In one embodiment, the molecular weight of the polymer is from 1500 to 2000 and contains 15 to 50 mole % of dithiocarbamate salt groups. In a further embodiment, the molecular weight of the polymer is from 1500 to 2000 and contains 25 to 40 mole % of dithiocarbamate salt groups.

Also, the composition of the present invention can be formulated with other small molecule sulfide precipitants such as sodium sulfide, sodium hydrosulfide, TMT-15® (sodium or calcium salts of trimercapto-5-triazine; Evonik Industries Corporation 17211 Camberwell Green Lane, Houston, Tex. 77070, USA), dimethyldithiocarbamate and diethyldithiocarbamate.

B. Dosage

The dosage of the disclosed polymers for use may vary. The calculation of dosage amounts can be done without undue experimentation.

Process medium quality and extent of process medium treatment are a couple of factors that can be considered by one of ordinary skill in the art in selecting dosage amount. A jar test analysis is a typical example of what is utilized as a basis for determining the amount of dosage required to achieve effective metals removal in the context of a process water medium, e.g. wastewater.

In one embodiment, the amount of modified polymer of the invention capable of effectively removing metals from contaminated waters is preferably within the range of 0.2 to 2 moles of dithiocarbamate per mole of metal. More preferably, the dosage is 1 to 2 moles of dithiocarbamate per mole of metal contained in the water. According to one embodiment of the invention, the dosage of metal removal polymer required to chelate and precipitate 100 ml of 18 ppm soluble copper to about 1 ppm or less was 0.011 gm (11.0 mg) of polymer. The metal polymer complexes formed are self flocculating and quickly settle. These flocculants are easily separated from the treated water.

In the context of applying the polymer to a gas system, such as a flue gas, the polymer can be dosed incrementally and capture rates for a particular metal, e.g. such as mercury, can be calculated by known techniques in the art.

C. Methods of Use

The present disclosure also provides for a method of removing one or more metals from a medium containing these metals which comprises the steps of: (a) treating said medium containing metals with a composition comprising a polymer derived from at least two monomers: acrylic-x and an alkylamine, wherein said acrylic-x has the following formula:

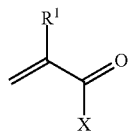

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals; and (b) collecting said treated metals.

The compositions as described above are incorporated into this section and can be applied within the claimed methodologies encompassed by this invention.

The target metals of interest will depend on the system/medium to be treated.

The metals can include zero valent, monovalent, and multivalent metals. The metals may or may not be ligated by organic or inorganic compounds. Also, the metals can be radioactive and nonradioactive. Examples include, but are not limited to, transition metals and heavy metals. Specific metals can include, but are not limited to at least one of the following: copper, nickel, zinc, lead, mercury, cadmium, silver, iron, manganese, palladium, platinum, strontium, selenium, arsenic, cobalt and gold.

In one embodiment, the metals are at least one or a combination of the following: copper, nickel, zinc, lead, mercury, cadmium, silver, iron, manganese, palladium, platinum, strontium, selenium, arsenic, cobalt and gold.

In another embodiment, the metals are transition metals.

In another embodiment, the metals are heavy metals.

Mediums containing metals can vary and include at least one of the following wastewater streams, liquid hydrocarbonaceous streams, flue gas streams, flyash, and other particulate matter.

Various processing steps can be coupled with metals removal, including, but not limited to filtration steps and/or air quality control devices, e.g. baghouses and electrostatic precipitators and other air quality control devices.

Mediums containing a liquid phase medium/a medium containing a liquid phase are one target for the claimed invention.

In one embodiment, the medium is a process stream containing water, e.g. wastewater or wastewater from a power plant or industrial setting (power plant, mining operation, waste incineration, and/or manufacturing operation).

In another embodiment, the medium is a liquid hydrocarbonaceous stream common in petroleum refining processes or petrochemical processes. Examples include streams from these processes that contain petroleum hydrocarbons such as petroleum hydrocarbon feedstocks including crude oils and fractions thereof such as naphtha, gasoline, kerosene, diesel, jet fuel, fuel oil, gas oil vacuum residual, etc or olefinic or napthenic process streams, ethylene glycol, aromatic hydrocarbons, and their derivatives.

In another embodiment, additional chemistries, flocculants and/or coagulants can be utilized in conjunction with the chemistry encompassed by this invention. The chemistries applied to a medium containing metals can vary, including, the addition of at least one of the following: cationic polymers, anionic polymers, amphoteric polymers, and zwitterionic polymers.

In another embodiment, the method of this invention further comprises an additional treatment to the process stream with a complexing amount of a water soluble ethylene dichloride ammonia polymer having a molecular weight of from 500 to 100,000 which contains 5 to 50 mole % of dithiocarbamate salt groups to form a complex of these metals, e.g. heavy metals. In a further embodiment, the molecular weight of the polymer is from 1500 to 2000 and contains 15 to 50 mole % of dithiocarbamate salt groups. In yet a further embodiment, the molecular weight of the polymer is from 1500 to 2000 and contains 25 to 40 mole % of dithiocarbamate salt groups.

In another embodiment, the polymer treatment and additional treatment are added in a ratio of 1:1.

Mediums containing a gas phase medium/a medium containing a gas phase are another target for the claimed invention. In addition, processes containing a liquid and/or gas phase medium are encompassed by this invention as well.

In another embodiment, the medium is part of a heat generating system, e.g. a flue gas stream.

In another embodiment, the heat generating system is at least one of the following: a combustion system; a power plant combustion system; a coal combustion system; a waste incineration system; a kiln; a kiln for mining or cement operations; and an ore processing system.

In another embodiment, the method of this invention further comprises applying an oxidizing agent to a heat generating system. In a further embodiment, the oxidizing agent is applied prior to said polymer treatment.

In a yet a further embodiment, a multiphase treatment protocol for a process involves treating a gas and a liquid, e.g. one or more metals in a gas such as mercury and one or more metal in a liquid. This can involve the polymer treatment and additional treatment as described above.

In yet a further embodiment, the oxidizing agent is at least one of the following: a thermolabile molecular halogen, calcium bromide, or a halogen containing compound.

In yet a further embodiment, this invention further comprises applying an oxidizing agent to the flue gas; optionally wherein said oxidizing agent oxidizes a target species at a temperature of 500° C. or greater or a temperature where the oxidant is capable of oxidizing molecular mercury that exists in a process that generates mercury; optionally wherein said target species is elemental mercury or derivatives thereof; and optionally wherein said oxidizing agent is at least one of the following: a thermolabile molecular halogen, calcium bromide, or a halogen containing compound. Mercury oxidant methodologies are described in U.S. Pat. Nos. 6,808,692 and 6,878,358, which are herein incorporated by reference.

In another embodiment, the polymer treatment occurs at a temperature 300° C. or below, preferably 250° C. or below.

The following examples are not meant to be limiting.

EXAMPLES

A. Polymer Preparation

Example 1

Methyl Acrylate/Tetraethylenepentamine Polymer Backbone which is then Functionalized with a Dithiocarbamate Group a. Methyl Acrylate/Tetraethylenepentamine Polymer Backbone Synthesis Tetraethylenepentamine (TEPA) (18.275 weight %) was charged into a glass reactor fitted with a mechanical stirrer and a condenser. While purging the headspace with nitrogen and stirring, methyl acrylate (16.636 weight %) was added dropwise over 30 min where the temperature was maintained between 25-31° C. during the addition and for 1 h after the addition was finished. Next, a second charge of TEPA (18.275 weight %) was performed and the resulting reaction mixture was heated to 130° C. This temperature was held for ~3 h while collecting the condensate in a Dean-Stark trap. At this time, the polymer melt was allowed to cool to 120° C. and then slowly diluted with deionized (DI) water (46.814 weight %) keeping the temperature above 90° C. during the dilution. The resulting ~50 weight % polymer solution was then cooled to room temperature. Weight average molecular weight of the polymer was determined to be 7,500 using a size exclusion chromatography method and polysaccharide standards.

b. Dithiocarbamate Polymer Preparation

The second step involved adding the methyl acrylate/TEPA polymer (35.327 weight %), DI Water (28.262 weight %), and Dowfax 2A1 (0.120 weight %), Dow Chemical Company Midland, Mich. 48674, USA, to a round bottom flask fitted with a mechanical stirrer. Next, a 50% NaOH solution (9.556 weight %) was added to the stirring reaction mixture. Once the mixture was heated and maintained at 40° C., carbon disulfide (17.179 weight %) was added drop-wise over 2 h. One hour within the carbon disulfide addition, another amount of 50% NaOH (9.556 weight %) was charged. The reaction mixture was maintained at 40° C. for an additional 2 h. Finally, the reaction was cooled to room temperature and filtered though filter paper to obtain ~40 weight % polymeric dithiocarbamate product.

Example 2

Acrylic Acid/Tetraethylenepentamine Polymer Backbone which is then Functionalized with a Dithiocarbamate Group a. Acrylic Acid/Tetraethylenepentamine Polymer Backbone Synthesis Tetraethylenepentamine (TEPA) (37.556 weight %) and sulfuric acid (0.199 weight %) was charged into a glass reactor fitted with a mechanical stirrer and a condenser. While purging the headspace with nitrogen and stirring, acrylic acid (14.304 weight %) was added dropwise over 30 min where the temperature was maintained between 130-140° C. during the addition, allowing the exotherm from the acid base reaction to reach the desired temperature. Next the resulting reaction mixture was heated to 160° C. This temperature was held for 4.5 h while collecting the condensate in a Dean-Stark trap. At this time, the polymer melt was allowed to cool to 120° C. and then slowly diluted with DI water (47.941 weight %) keeping the temperature above 90° C. during the dilution. The resulting ~50 weight % polymer solution was then cooled to room temperature. Weight average molecular weight of the polymer was determined to be 4,700 using a size exclusion chromatography method and polysaccharide standards.

b. Dithiocarbamate Polymer Preparation

The second step involved adding the acrylic acid/TEPA polymer (31.477 weight %), DI Water (36.825 weight %), and Dowfax 2A1 (0.118 weight %) to a round bottom flask fitted with a mechanical stirrer. Next, a 50% NaOH solution (8.393 weight %) was added to the stirring reaction mixture. Once the mixture was heated and maintained at 40° C., carbon disulfide (14.794 weight %) was added drop-wise over 2 h. One hour within the carbon disulfide addition, another amount of 50% NaOH (8.393 weight %) was charged. The reaction mixture was maintained at 40° C. for an additional 2 h. Finally, the reaction was cooled to room temperature and filtered though filter paper to obtain ~35 weight % polymeric dithiocarbamate product.

Example 3 a. Acrylamide/Tetraethylenepentamine Polymer Backbone Synthesis

Tetraethylenepentamine (TEPA) (14.581 weight %) was charged into a glass reactor fitted with a mechanical stirrer and a condenser. While purging the headspace with nitrogen and stirring, a 48.6% acrylamide solution (30.441 weight %) was added dropwise over 1 h during which the desired temperature was reached and was maintained between 65-75° C. After the acrylamide charge, the temperature was maintained for an additional 1 h. Next, a second charge of TEPA (14.581 weight %) was performed and the resulting reaction mixture was heated to 160° C. while collecting the distilled water via a Dean-Stark trap. This temperature was held for ~4 h while continuing to collect the condensate in a Dean-Stark trap and trapping the released ammonia side product. At this time, the polymer melt was allowed to cool to 120° C. and then slowly diluted with DI water (40.397 weight %) keeping the temperature above 90° C. during the dilution. The resulting ~50 weight % polymer solution was then cooled to room temperature. Weight average molecular weight of the polymer was determined to be 4500 using a size exclusion chromatography method and polysaccharide standards.

b. Dithiocarbamate Polymer Preparation

The second step involved adding the acrylamide/TEPA polymer (34.004 weight %), DI Water (36.518 weight %), and Dowfax 2A1 (0.122 weight %) to a round bottom flask fitted with a mechanical stirrer. Next, a 50% NaOH solution (7.763 weight %) was added to the stirring reaction mixture. Once the mixture was heated and maintained at 40° C., carbon disulfide (13.830 weight %) was added drop-wise over 2 h. One hour within the carbon disulfide addition, another amount of 50% NaOH (7.763 weight %) was charged. The reaction mixture was maintained at 40° C. for an additional 2 h. Finally, the reaction was cooled to room temperature and filtered though filter paper to obtain ~35 weight % polymeric dithiocarbamate product.

B. Wastewater Testing Analysis

As stated above, the typical protocol for determining the amount and potential effectiveness of a polymers ability to scavenge a metal in a process water is through jar test analysis.

1. Example of Method of Use on Typical 20 ppm Cu Wastewater Using Jar Test

Generally, all polymers were prepared as a 12 weight % polymer solutions in DI water and prepared fresh on the day of testing. Copper containing water was used for testing.

Six 300 mL samples (jars) of wastewater were placed in 500 mL beakers and set up on a gang stirrer. The samples of wastewater were mixed at 150 revolutions per minute (rpm) while the polymer was dosed into the samples. The dosages used were 0.50 g, 0.63 g, 0.75 g, 0.88 g, and 1.00 g of polymer solutions prepared as described above. The mixing at 150 rpm was continued for a total of 10 minutes. This was then followed by a slow mix (35 rpm) for 10 minutes. After the mixing was completed, the precipitate was allowed to settle, undisturbed, for an additional 10 minutes. Next, the water samples were filtered through 0.45 micron filters. The filtrate was then acidified to pH=2 with concentrated nitric acid to stop any further precipitation of the copper. Residual soluble copper was determined in the filtered water samples by atomic absorption analysis using copper standards for reference. One set of jars was run for each polymer tested. Duplicates for several polymers were run and confirmed the reported results.

It should be noted that the observed filtration rates were typically less than 1 minute for contaminated water treated with the polymer while the filtration rate for water treated with small molecule metals precipitants, such as trimercapto-S-triazine or dimethyldithiocarbamate, was typically greater than 2 minutes.

2. Example of Method of Use on Typical Hg Wastewater Using Jar Test

Generally, all polymers were prepared as a 5 weight % polymer solutions in DI water and prepared fresh on the day of testing. Mercury containing water was used for testing.

Six 500 mL samples (jars) of wastewater were placed in 1 L beakers and set up on a gang stirrer. The samples of wastewater were mixed at 300 rpm while the polymer was dosed into the samples. The dosages used were 0.050 g, 0.100 g, 0.150 g, and 0.250 g of polymer solutions prepared as described above. The mixing at 300 rpm was continued for a total of 25 minutes. At this point, 5 ppm of a cationic flocculant was added and then followed by a slow mix (15 rpm) for 5 minutes. After the mixing was completed, the precipitate was allowed to settle, undisturbed, for an additional 45 minutes. Next, the water samples were filtered through 0.45 micron filters. Residual mercury was determined in the filtered water samples according to United States EPA method 1631. One set of jars was run for each polymer tested. Duplicates for several polymers were run and confirmed the reported results.

It should be noted that the observed filtration rates were typically faster than water treated with small molecule metals precipitants, such as trimercapto-S-triazine or dimethyldithiocarbamate.

3. Example of Performance on Typical Cu Wastewater Using Jar Tests

| Residual Copper (ppm) from a Contaminated Water Supply | | | | | |
|---|---|---|---|---|---|
| | Polymer Dose (mg)/100 mL wastewater | | | | |
| Example | 0 | 6.8 | 8.5 | 10.2 | 11.9 |
| 1b | 19.1 | 8.0 | 4.8 | 2.1 | 0.3 |

| Residual Copper (ppm) from a Contaminated Water Supply | | | | | |
|---|---|---|---|---|---|
| | Polymer Dose (mg)/100 mL wastewater | | | | |
| Example | 0 | 7.0 | 8.8 | 10.5 | 12.3 |
| 2b | 18.6 | 7.8 | 4.5 | 2.61 | 0.2 |
| | Polymer Dose (mg)/100 mL wastewater | | | | |
| Example | 0 | 6.8 | 8.5 | 10.2 | 11.9 |
| 3b | 19.1 | 7.8 | 5.2 | 2.5 | 0.7 |

C. General Procedures for Use of Polymers in a Wastewater Treatment System

FIG. 1 shows a general schematic for a wastewater treatment process. In this particular FIGURE, the wastewater treatment scheme is based on the treatment of a flue gas desulphurization chloride purge from a power plant. The polymers of the present invention can be applied to at least one of the precipitation, coagulation, and flocculation steps.

Combinations of Components Described in Patent Application

In one embodiment, the composition of matter claims include various combinations of the polymer components such as molecular weight, functional groups, monomer components, and molar amounts of said components. In a further embodiment, the claimed compositions include combinations of the dependent claims. In a further embodiment, a range or equivalent thereof of a particular component shall include the individual component(s) within the range or ranges within the range.

In another embodiment, the method of use claims include various combinations of the polymer components such as molecular weight, functional groups, monomer components, and molar amounts of said components. In a further embodiment, the claimed methods of use include combinations of the dependent claims. In a further embodiment, a range or equivalent thereof of a particular component shall include the individual component(s) within the range or ranges within the range.

We claim:

1. A method of removing one or more metals from a medium containing said metals which comprises the steps of: (a) treating said medium containing metals with a composition comprising a polymer derived from at least two monomers: acrylic-x and an alkylamine, and wherein said acrylic-x has the following formula:

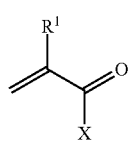

wherein X=OH and salts thereof or $NHR^2$ and wherein $R^1$ and $R^2$ is H or an alkyl or an group, wherein the molecular weight of said polymer is between 500 to 200,000, and wherein said polymer is modified to contain a functional group capable of scavenging said medium containing one or more metals; and (b) collecting said metals.

2. The method of claim 1, wherein said functional group is a dithiocarbamate salt group and wherein said polymer has between 5 to 100 mole % of said dithiocarbamate salt group.

3. The method of claim 1, wherein the acrylic-x is acrylic acid or salts thereof and the alkylamine is pentaethylenehexamine or tetraethylenepetamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 55 mole percent dithiocarbamic acid or salts thereof.

4. The method of claim 1, wherein the acrylic-x is acrylamide and the alkylamine is pentaethylenehexamine or tetraethylenepetamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 55 mole percent dithiocarbamic acid or salts thereof.

5. The method of claim 1, wherein said medium is a process stream containing water.

6. The method of claim 1, wherein the metals are selected from the group consisting of: copper, nickel, zinc, lead, mercury, cadmium, silver, iron, manganese, palladium, platinum, strontium, selenium, arsenic, cobalt, gold, and any combination thereof.

7. The method of claim 1, further comprising an additional treatment of said process stream with a complexing amount of a water soluble ethylene dichloride ammonia polymer having a molecular weight of from 500 to 100,000 which contains 5 to 50 mole % of dithiocarbamate salt groups to form a complex of these metals.

8. The method of claim 1 wherein said medium is a heat generating system flue gas stream.

9. The method of claim 8 further comprising: applying an oxidizing agent to the flue gas; optionally wherein said oxidizing agent oxidizes a target species at a temperature of 500° C. or greater; optionally wherein said target species is elemental mercury or derivatives thereof; and optionally wherein said oxidizing agent is at least one of the following: a thermolabile molecular halogen, calcium bromide, or a halogen containing compound.

10. The method of claim 8 wherein said polymer treatment occurs at a temperature at or below 300° C.

11. A method of removing one or more metals from a medium containing said metals which comprises the steps of: (a) treating said medium containing metals with a composition comprising a polymer derived from at least two monomers: acrylic-x and an alkylamine, wherein said acrylic-x has the following formula:

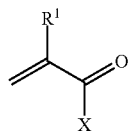

wherein X=OR and wherein R is an alkyl or aryl group, wherein $R^1$ is H or an alkyl or an aryl group, and wherein the molecular weight of said polymer is between 1,000 to 16,000, and wherein said polymer is modified to contain a functional group capable of scavenging said medium containing one or more metals; and collecting said metals.

12. The method of claim 11, wherein said functional group is a dithiocarbamate salt group and optionally wherein said polymer has between 5 to 100 mole % of said dithiocarbamate salt group.

13. The method of claim 11, wherein the acrylic-x is an acrylic ester and the alkylamine is pentaethylenehexamine or tetraethylenepetamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8000; and wherein the polymer is modified to contain more than 55 mole percent dithiocarbamic acid or salts thereof.

14. The method of claim 11, wherein said medium is a process stream containing water.

15. The method of claim 11, wherein the metals are selected from the group consisting of: copper, nickel, zinc, lead, mercury, cadmium, silver, iron, manganese, palladium, platinum, strontium, selenium, arsenic, cobalt, gold, and any combination thereof.

16. The method of claim 11, further comprising an additional treatment of said process stream with a complexing amount of a water soluble ethylene dichloride ammonia polymer having a molecular weight of from 500 to 100,000 which contains 5 to 50 mole % of dithiocarbamate salt groups to form a complex of these metals.

17. The method of claim 11 wherein said medium is a heat generating system flue gas stream.

18. The method of claim 17 further comprising: applying an oxidizing agent to the flue gas; optionally wherein said oxidizing agent oxides a target species at a temperature of 500° C. or greater; optionally wherein said target species is elemental mercury or derivatives thereof and optionally wherein said oxidizing agent is selected from the group consisting of: a thermolabile molecular halogen, calcium bromide, a halogen containing compound, and any combination thereof.

19. The method of claim 17 wherein said polymer treatment occurs at a temperature at or below 300° C.

20. The method of claim 13, wherein the acrylic ester is selected from the group consisting of: methyl acrylate, methyl methacrylate, ethyl acrylate, and ethyl methacrylate, propyl acrylate, propyl methacrylate, and any combination thereof.

* * * * *